United States Patent [19]
Brinkmann et al.

[11] 3,852,111
[45] Dec. 3, 1974

[54] LEAD STORAGE BATTERY CELL

[75] Inventors: Juergen Brinkmann, Berenbostel; Gerwin Trippe, Gevelsberg, both of Germany

[73] Assignee: Varta Batterie Aktiengesellschaft, Hannover, Germany

[22] Filed: Oct. 23, 1973

[21] Appl. No.: 408,815

[30] Foreign Application Priority Data
Oct. 23, 1972  Germany............................ 2251870

[52] U.S. Cl................... 136/26, 136/81, 136/134 R
[51] Int. Cl........................................... H01m 35/32
[58] Field of Search.............................. 136/79–80, 136/134, 81, 26–27, 135 R, 135 S, 6 A, 6 R; 204/286, 297 R

[56] References Cited
UNITED STATES PATENTS

| | | | |
|---|---|---|---|
| 1,240,280 | 9/1917 | Wilson | 136/134 R X |
| 3,061,661 | 10/1962 | Seeley | 136/135 R |
| 3,791,869 | 2/1974 | Brinkmann et al. | 136/81 |

*Primary Examiner*—Anthony Skapars
*Attorney, Agent, or Firm*—Gerard J. Weiser; Alfred Stapler; Karl L. Spivak

[57] ABSTRACT

The plate electrodes of a battery cell are made of separate upper and lower segments, electrically connected in parallel by current take-off connectors which, although of different lengths, are of compensatingly different resistivities so as to provide substantially equal resistance values.

10 Claims, 11 Drawing Figures

PATENTED DEC 3 1974 3,852,111

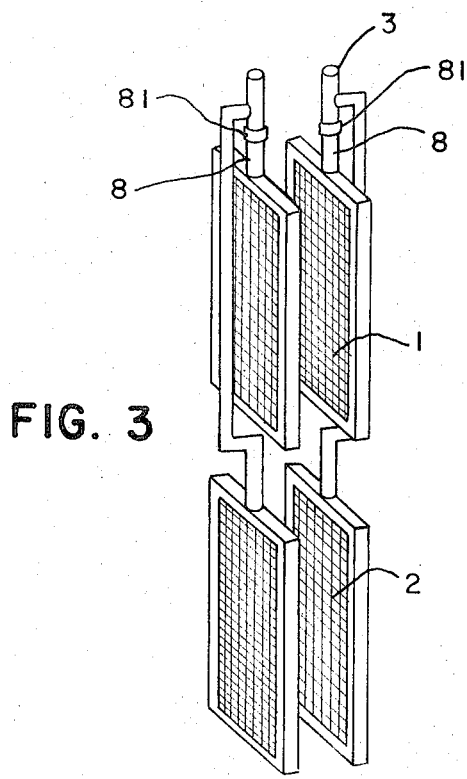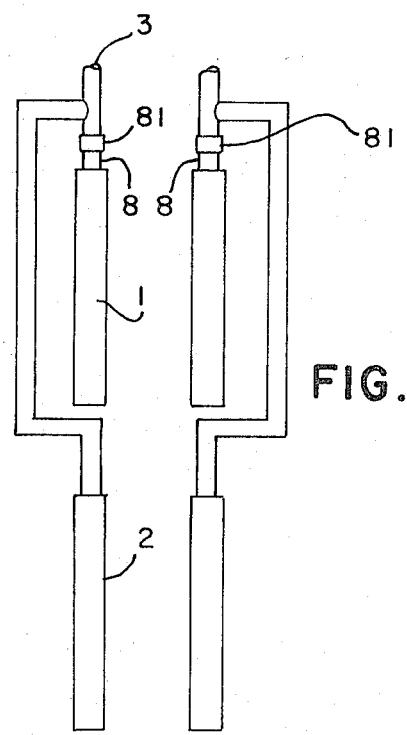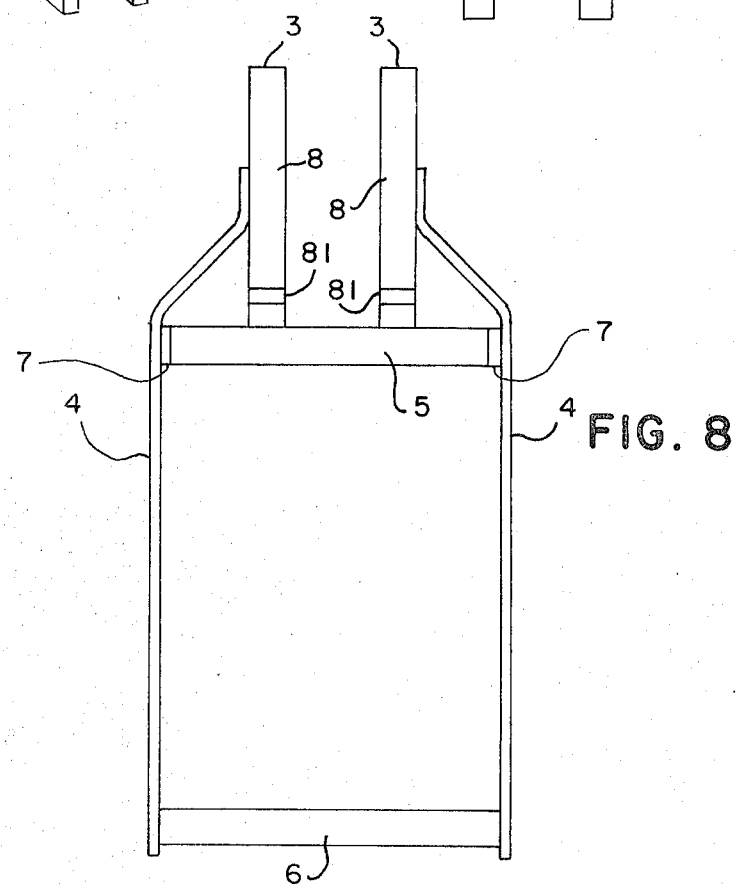

LEAD STORAGE BATTERY CELL

This invention relates to a lead storage battery having positive and negative plate electrodes, wherein these electrodes consist, respectively, of plural plate elements, spaced from each other and disposed vertically above one another. The plate segments of each polarity are mechanically and electrically connected among themselves by means of connecting straps and the superposed plate segments of the same polarity are linked together mechanically, and connected electrically in parallel by current take-off connectors.

In prior U.S. Patent Application Ser. No. 266,162, filed June 26, 1972, now U.S. Pat. No. 3,791,869, there is described a lead storage battery cell consisting of two or more such separated, vertically spaced plate element stacks, mechanically linked by current connectors and electrically connected in parallel by same.

By virtue of this parallel connection of the plate stacks, there is obtained an appreciable improvement in voltage properties, and a substantial increase in the amount of current and power that can be drawn from the battery, as compared with a battery of the same physical dimensions using conventional, undivided plate stacks.

In such vertically displaced arrangements of the plate segment stacks, the paralleling cannot be precise because, particularly with battery cells connected in accordance with the above-identified prior application, the current take-off connectors for the lower plate segments must extend upwardly for connection with the current take-off connectors for the upper plate segments. Thus, the current take-off connectors for the lower plate segments are appreciably longer than those for the upper segments. This greater length of their current take-off connectors imparts an additional resistance to the lower plate element stack.

When a cell is placed under load, voltage drops develop along the current take-off connectors of the lower plate segment stacks, with the voltage drops along the respective current take-off connectors for the positive and negative plate stacks adding together. As a result of this voltage drop developed along the current take-off connectors during cell discharge, the lower plate segments develop a higher potential, which exceeds that of the upper plate segments by the amount of the above-mentioned voltage drop along the two current take-off connectors. These differences in potential between the upper and lower plate segments lead to different loadings and therefore to different degrees of participation by the two plate segments in the current supply.

Measurements have shown that, when heavy current is drawn, the lower plate stack of a cell delivers only about 60% of the current delivered by the upper plate stack.

Accordingly, it is an object of the invention to eliminate the drawback described above.

It is another object to provide a lead storage battery, in which substantially exact paralleling takes place between the lower plate stack and the upper one.

It is still another object to achieve substantially equal current distribution between the upper and lower plate stacks.

These objects, and others which will appear, are achieved by constructing the current take-off connectors for the upper and lower plate segments so as to provide substantially equal electrical resistances. In accordance with a model of the invention, the current take-off connectors for the upper and lower plate-sets are made of copper, and are coated with lead in order to protect the copper against the acid in the electrolyte.

In accordance with one embodiment of the invention, current take-off connectors for the upper plate segments are made with smaller cross sections than the current take-off connectors for the lower plate segments.

In another embodiment, the electrical resistance of the current take-off connectors for the upper plate segments may be made up of a plurality of partial resistances, such as the resistance of the lead-clad core, and of an insert of an electrically resistive material placed inside these connectors. This may be accomplished by positioning the insert in a gap in the copper core of the current take-off connectors. While not limited thereto, lead is preferred for use as such an insert material.

In still another embodiment, the resistive material is placed inside the connectors leading to the terminal posts, and electrical insulating disks are positioned between the upper connecting strap and the current take-off connectors for the lower plate segments. The lower take-off connectors are then connected either to separate terminal posts or to the same terminal posts as the upper connecting strap.

For further details, reference is made to the description which follows in the light of the accompanying drawings, wherein FIGS. 1 and 2 are diagrammatic illustrations of a battery cell in accordance with the prior art;

FIGS. 3 and 4 are diagrammatic illustrations of a cell in accordance with an embodiment of the present invention;

FIGS. 6, 7 and 8 show various embodiments of the invention, embodied in plate hanger frames of the general type shown in FIG. 5;

The same reference numerals are used to designate similar elements in the various figures.

Figure 1:
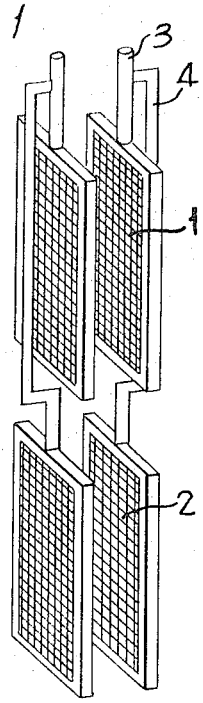
Figure 2:
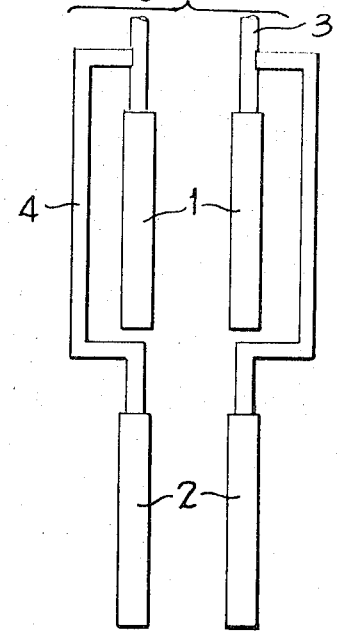

Referring to FIGS. 1 and 2, as previously stated, they represent the prior art as disclosed in the above-identified prior patent application Ser. No. 266,162. In particular, FIGS. 1 and 2 of the present case correspond, respectively, to FIGS. 1 and 2 of said prior application, and the description of these figures in said prior application is incorporated herein by reference. Briefly, these figures show, in perspective and elevation, respectively, two adjacent storage battery plates which may be the positive and negative plates, respectively. Each plate consists of two segments 1 and 2. Segments 1 and 2 are diposed above one another, but spaced apart in the vertical direction.

Mechanical and electrical connection between segments 1 and 2 takes place by means of connectors 4. These connectors serve to connect the two separate plate segments 1 and 2 electrically in parallel. Terminal posts 3 provide the electrical output connections for the parallel plate segments.

Referring to FIGS. 3 and 4, these show corresponding diagrammatic views of plate arrangements embodying the present invention. In particular, an auxiliary resistive insert 81 is shown in the portion 8 of the current connector leading toward terminal posts 3.

Figure 5:
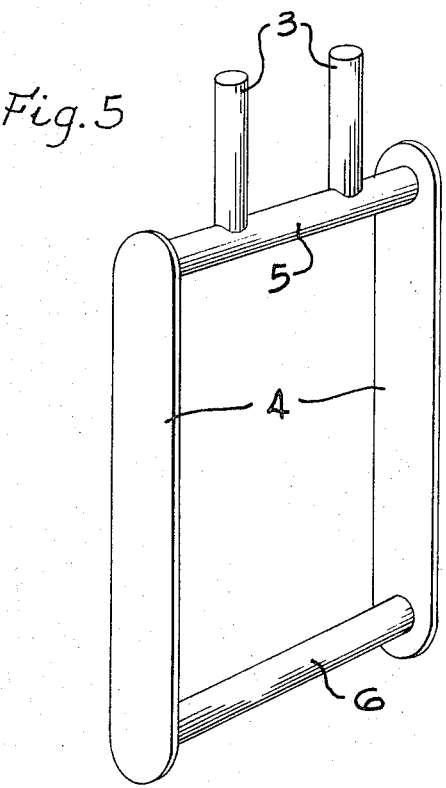
FIG. 5 shows a plate hanger frame in accordance with the prior art.

FIG. 5, as previously noted, also shows the prior art, as disclosed in application Ser. No. 266,162, and corresponds particularly to FIG. 3 of said prior application. The description of that figure of said prior application is incorporated herein by reference. Briefly, FIG. 5 of the present application shows a plate hanger for mounting the upper and lower plate segments 1 and 2 (FIGS. 1 and 2). This hanger includes vertical side rail connectors 4, connecting straps 5 and 6, and terminal posts 3. The upper and lower plate segments (not shown) are suspended from upper and lower connecting straps 5 and 6, respectively.

Figure 6:
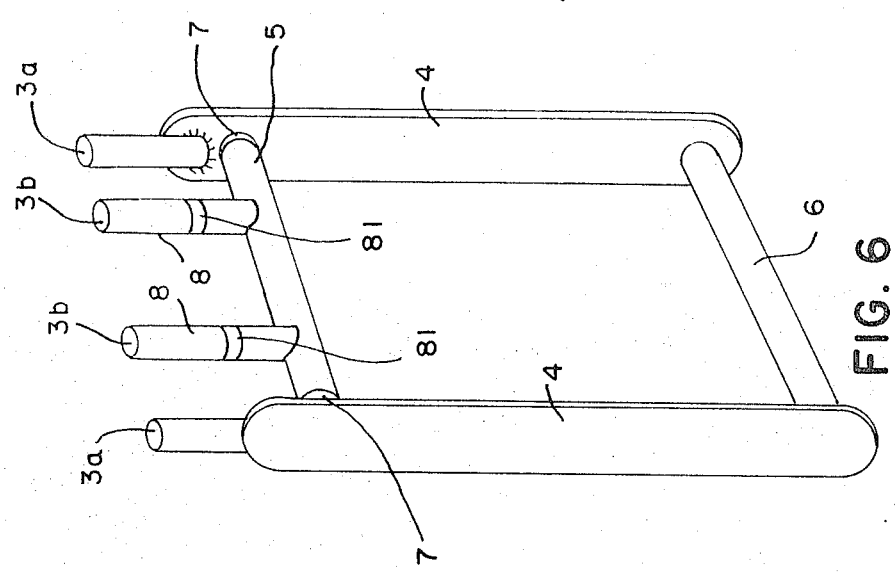

FIG. 6, to which reference may now be had, shows a plate hanger of the same general type as that of FIG. 5, but embodying one form of the present invention. In particular, additional terminal posts 3a, are attached directly to connectors 4, providing separate electrical connections to lower connecting strap 6. On the other hand, upper connecting strap 5 is provided with terminal posts 3b having portions 8 within which are located electrically resistive inserts 81. Electrically insulating disks 7 are placed at the ends of upper connecting strap 5, where that strap meets connectors 4. These disks may be made of a variety of conventional materials, including rubber, hard rubber, polypropylene, polyethylene and PVC.

Resistive inserts 81 are provided with resistance values such as to increase the resistance of the paths leading to terminal posts 3b to the point where it is equivalent to the resistance of connectors 4. Parallel connection of the upper and lower plate segments takes place by means of an electrical connector joining all of terminal posts 3a and 3b. This may take any conventional form. For example, posts 3a and 3b may terminate above the lid of the battery casing (not shown) and there be joined by a bus bar attached to the posts in conventional fashion, as by welding, soldering or screwing.

Figure 7:
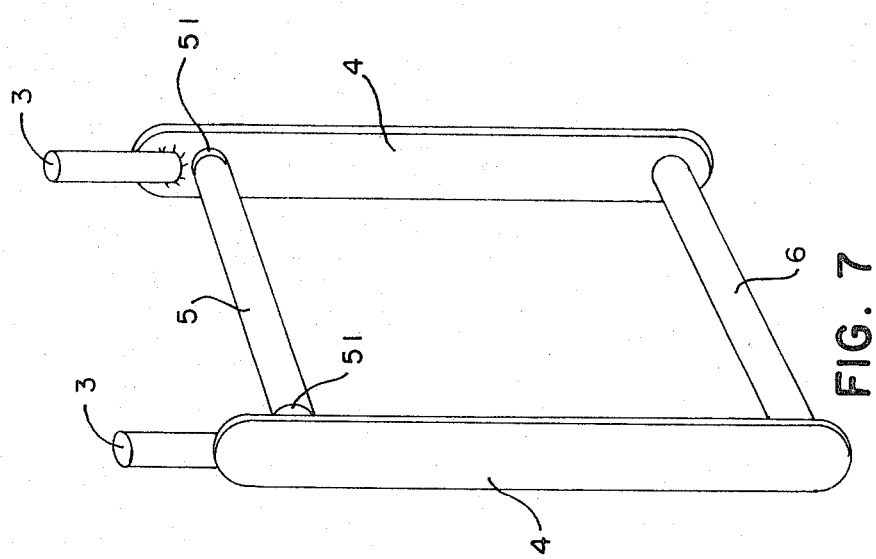

In the embodiment of FIG. 7, to which reference may now be had, there are provided only two terminal posts 3, respectively attached directly to connectors 4. At the ends of upper connecting strap 5, there are provided resistive inserts 51, which may be similar in their construction to inserts 81 of FIG. 6. Again the value of these resistive inserts 51 is chosen to substantially equal the resistance of connectors 4.

In the embodiment of FIG. 8, to which reference may now be had, there are again provided two terminal posts 3. In portions 8 of these terminal posts, there are provided resistive inserts 81, and the opposite ends of upper connecting strap 5 terminate in insulating disks 7. However, in FIG. 8, connectors 4 are extended upwardly so as to join and electrically connect to terminal posts 3, above resistive inserts 81. These inserts are chosen to have substantially the same resistance values as connectors 4.

Figure 9:
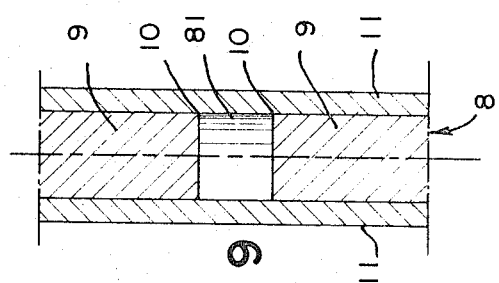
FIGS. 9 and 10 show enlarged cross sections of portions of FIGS. 6 and 8.

FIG. 9, to which reference may now be had, shows one specific form which portion 8 including resistive insert 81 may take. This includes a copper core 9 having a gap within which is placed the insert 81 of resistive material. At both ends 10, this insert 81 of resistive material is electrically joined to the copper core 9. A lead sheath 11 encircles the entire structure.

Figure 10:
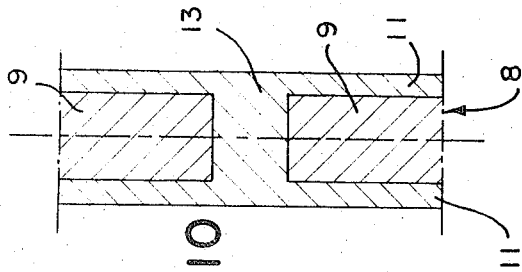

FIG. 10 shows another form which this resistive insert may take. In this form, there is again a gap in which there is inserted a portion 13 of the lead which forms sheath 11. As is well known, lead has substantially higher electrical resistivity than copper, and therefore is capable of serving as the desired resistive insert.

In accordance with the invention, it is also feasible to reduce the cross sections of the current conductive elements 5 and 8 serving the upper plate segments 1, relative to the cross sections of the conductive elements 4 and 6 which serve the lower plate segments 2. Alternatively, or additionally, the cross sections of elements 4 and 6 may be increased over and above their conventional sizes. Such an arrangement may be used in those cases in which the resulting greater weight and reduced mechanical strength are not important.

Figure 11:
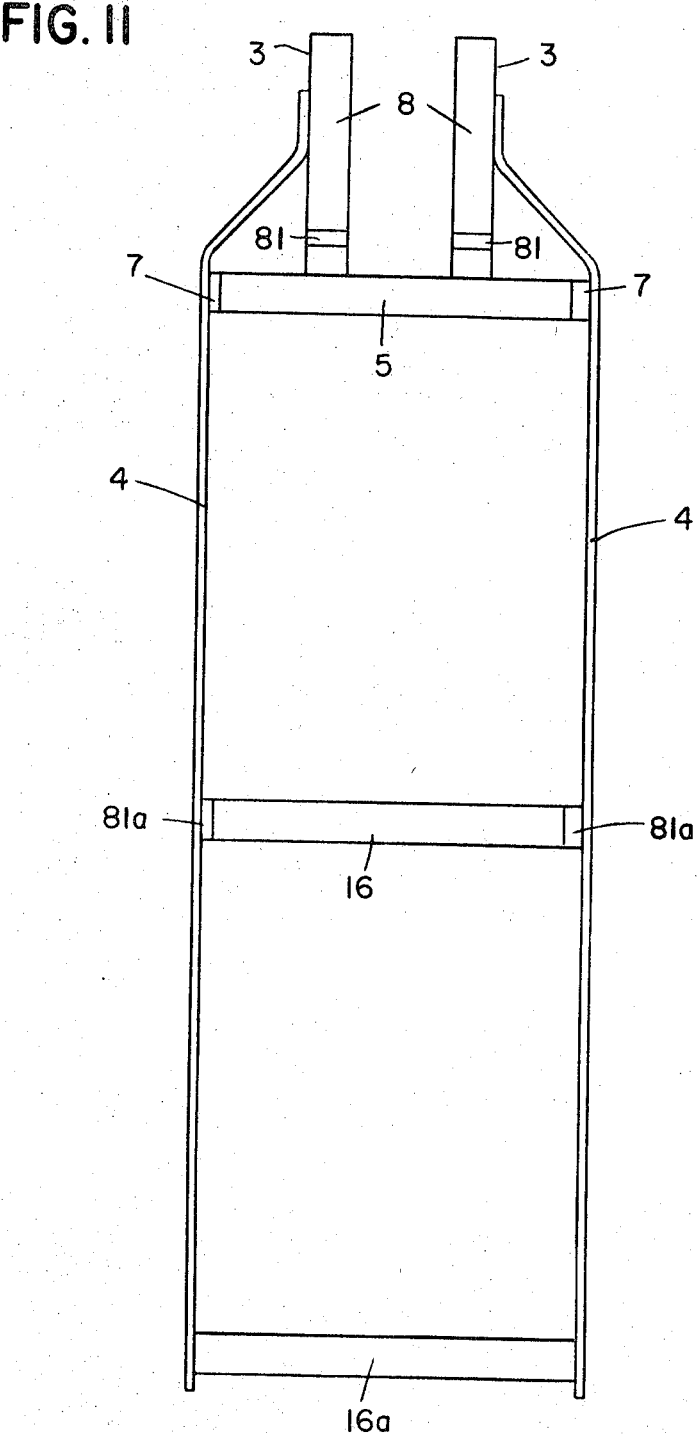
FIG. 11 shows still another plate hanger embodying the invention, for use with more than two plate segments.

FIG. 11 shows the invention applied to a hanger which is capable of supporting three vertically displaced plate segments. These segments (not shown) are respectively suspended from top, middle and bottom connecting straps 5, 16 and 16a. In this arrangement, strap 16a is conductively connected directly to side rail connectors 4, while strap 16 is connected to these side rails 4 via resistance elements 81a. These elements 81a may be similar in construction to elements 81. The resistance relationships between elements 81 and 81a are so chosen, relative to each other and relative to side rails 4, that all plate segments are connected with equal resistance to terminal posts 3. For example, if the portions of side rails 4 connecting strap 5 to strap 16 are similar to those connecting strap 16 to strap 16a then the resistance of elements 81 should be about twice that of elements 81a.

We claim:

1. Plate electrode means for storage batteries comprising:
   a plurality of separate plate segments, spaced from each other and positioned vertically above one another, and
   separate current take-off connectors for said respective segments mechanically linking said segments and connecting them electrically in parallel, said connectors having substantially equal electrical resistance.

2. The electrode means of claim 1 wherein said connectors for the upper one of said plate segments are of smaller cross-section than the connectors for the lower of said segments.

3. Electrode means according to claim 1 wherein the connectors for the upper plate segment are formed of multiple portions having distinctive resistance values.

4. Electrode means according to claim 3 characterized in that said connector portions are formed respectively of a lead and copper core and of a material of different resistance inserted in a gap in said core.

5. Electrode means according to claim 4 wherein said insert material is electronically connected to said copper core at both ends of the insert.

6. Electrode means according to claim 4 wherein said insert material is lead.

7. Electrode means according to claim 3 wherein said upper plate segment connectors include the upper connecting strap of a plate hanger frame and the ends of said connecting strap are electrically insulated from the side rail connectors of said frame.

8. Electrode means according to claim 3 wherein the connectors for both the upper and lower plate segments are electrically interconnected at common terminal posts, and electrically insulated from each other elsewhere.

9. A lead storage battery cell comprising:
positive and negative plate electrodes, each respective electrode including a plurality of plate segments, spaced from each other and positioned vertically above one another, and
a separate set of current take-off connectors for each segment, the plate segments of a given polarity being connected electrically in parallel by their respective sets of connectors, said connectors all having substantially equal resistance.

10. The cell of claim 9 wherein the connectors for the upper plate segments of a given electrode are shorter than those for the lower segments, but of comparatively higher resistivity.

* * * * *